Figure 1:
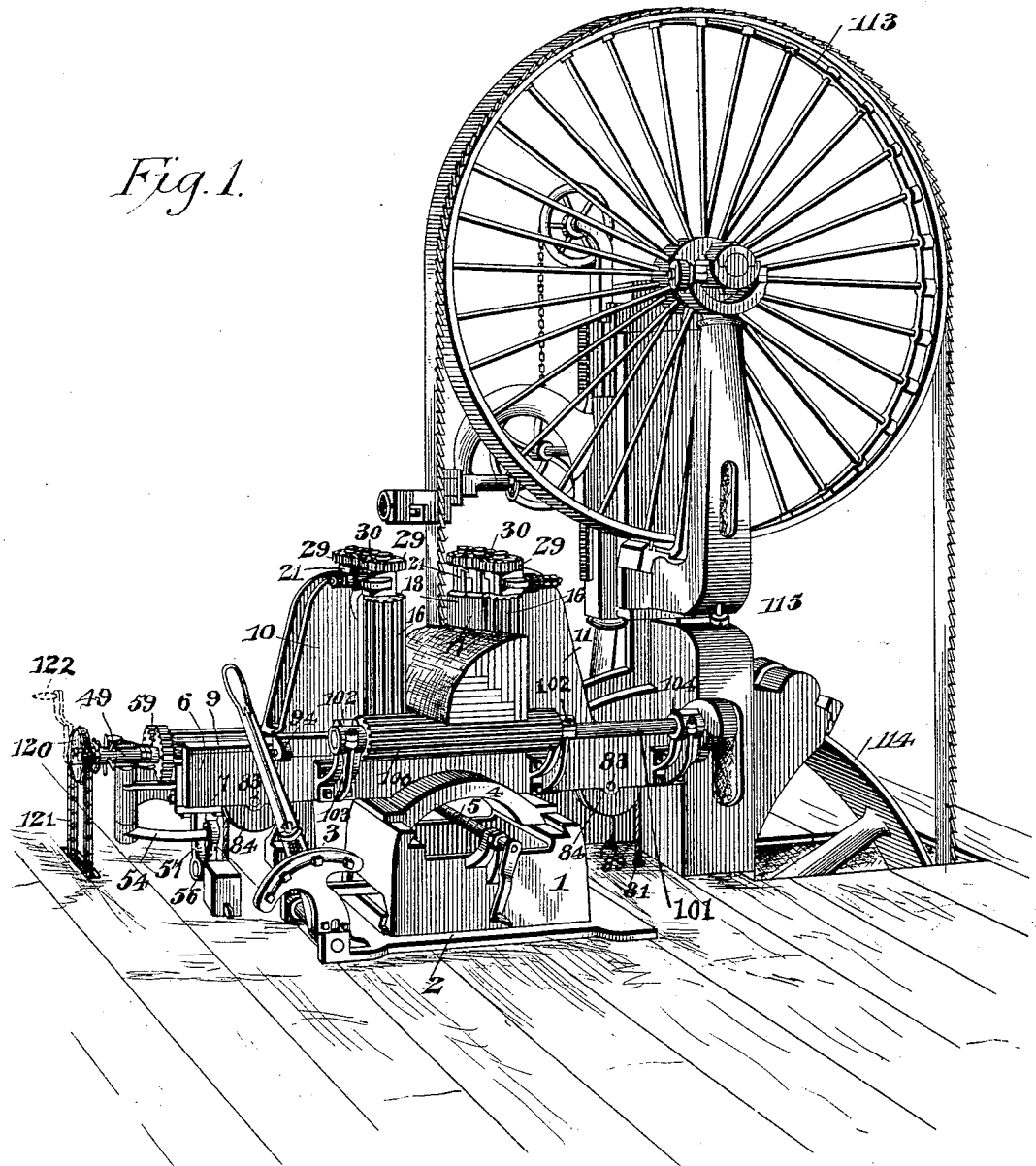

No. 633,028. Patented Sept. 12, 1899.
F. McDONOUGH.
FEED WORKS FOR RESAWING MACHINES.
(Application filed Aug. 23, 1898.)
(No Model.) 8 Sheets—Sheet 1.

Witnesses
Frank McDonough Inventor
By his Attorneys.

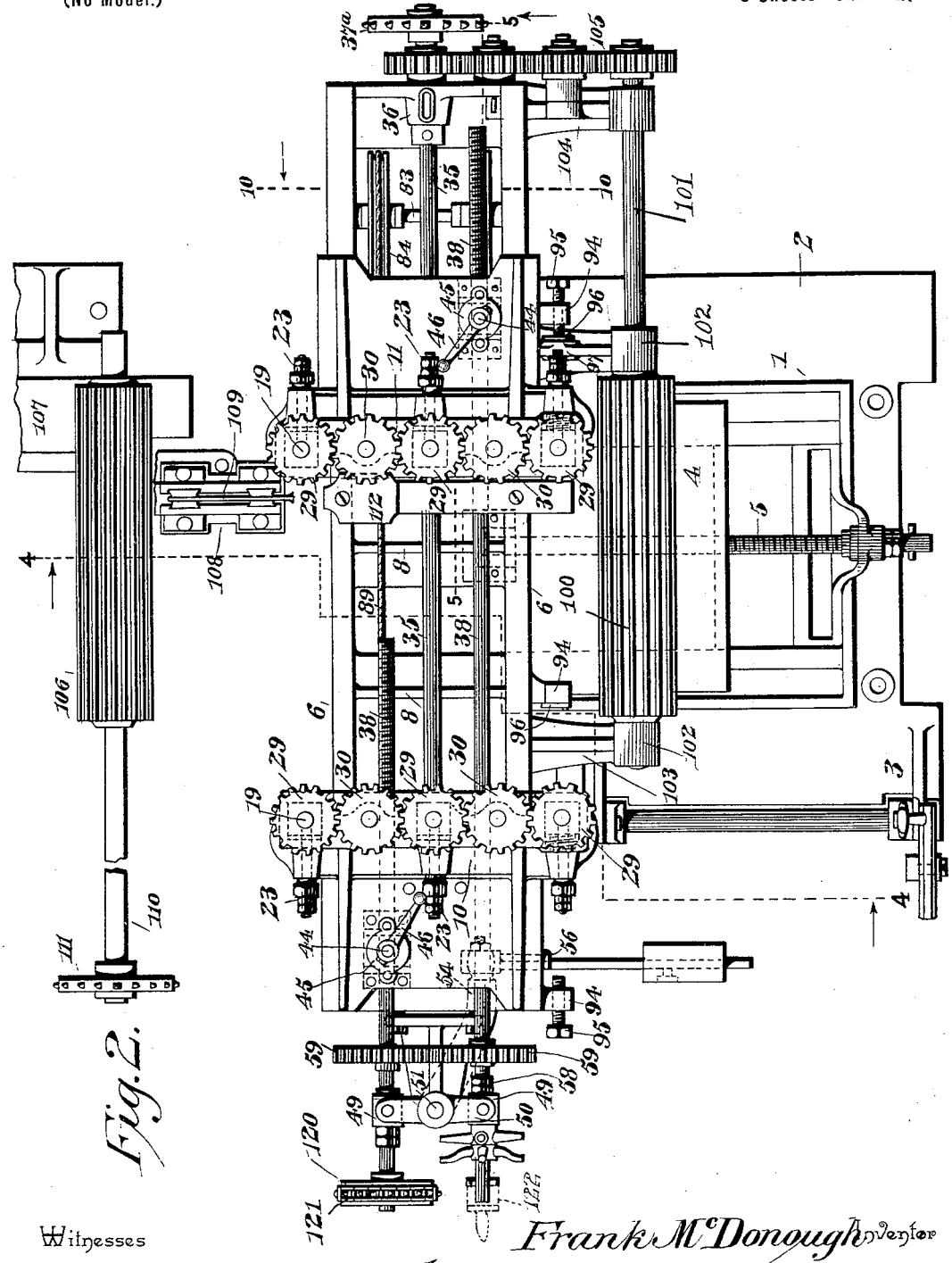

No. 633,028. Patented Sept. 12, 1899.
F. McDONOUGH.
FEED WORKS FOR RESAWING MACHINES.
(Application filed Aug. 23, 1898.)
(No Model.) 8 Sheets—Sheet 3.
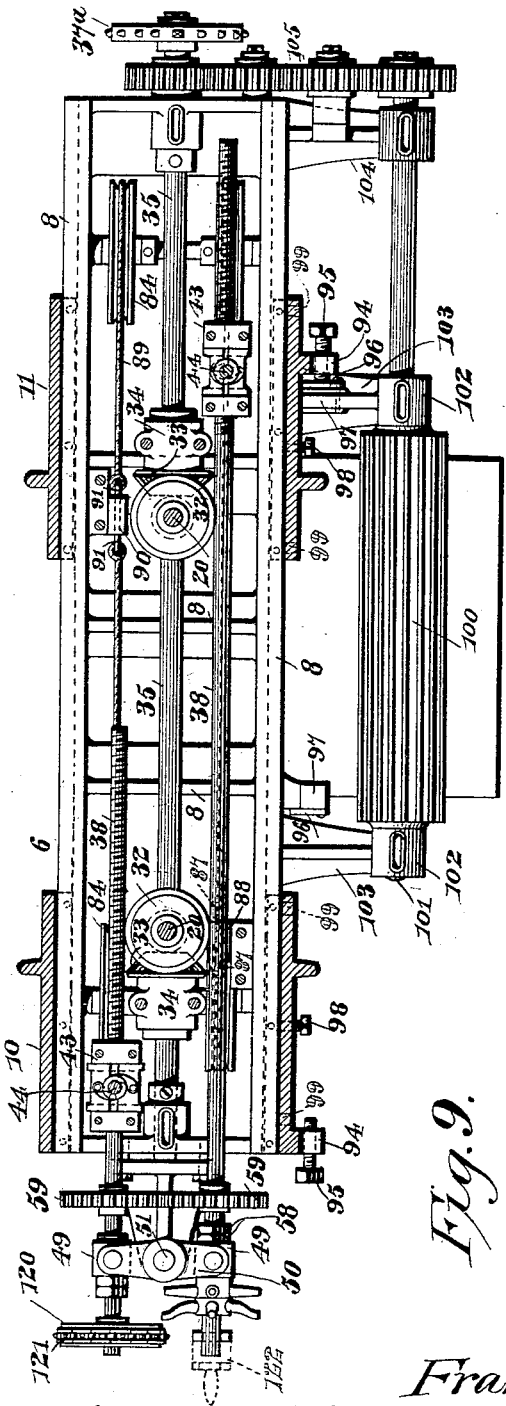
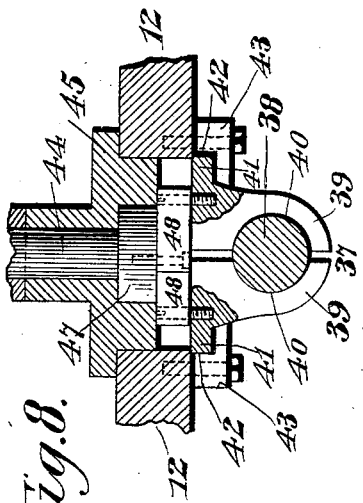
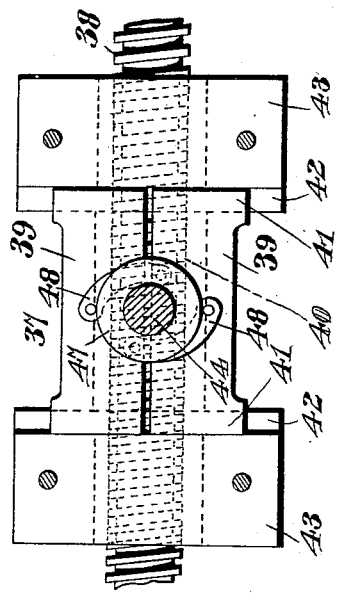
Witnesses Frank McDonough, Inventor
By his Attorneys.

No. 633,028. Patented Sept. 12, 1899.
F. McDONOUGH.
FEED WORKS FOR RESAWING MACHINES.
(Application filed Aug. 23, 1898.)
(No Model.) 8 Sheets—Sheet 4.
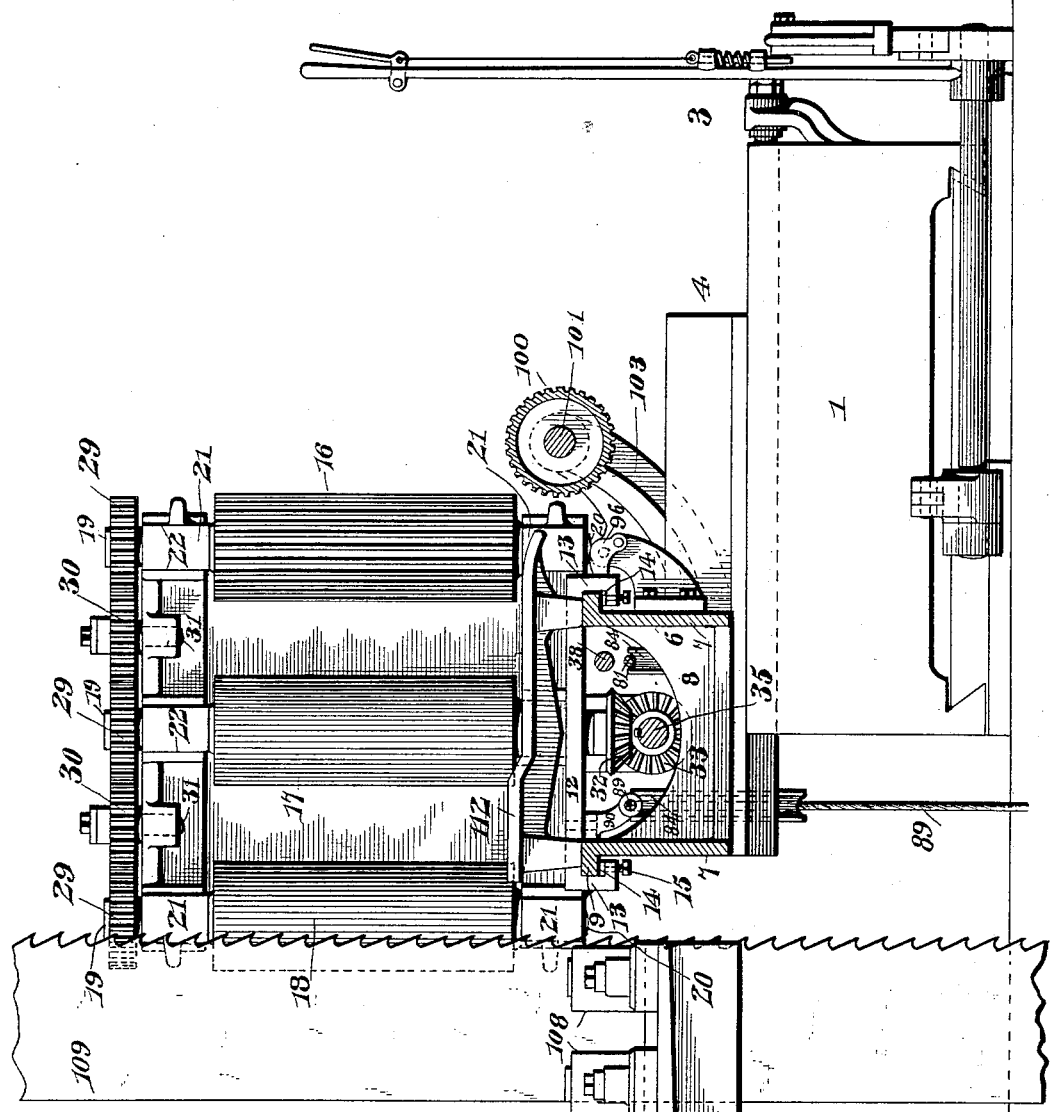
Fig. 4.
Witnesses
Jas. K. McCathran
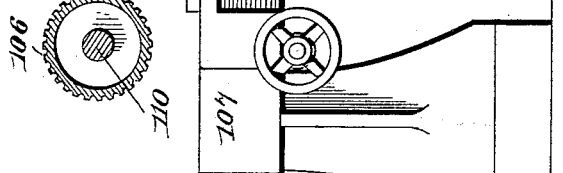
Frank McDonough Inventor
By his Attorneys.
C. A. Snow & Co.

No. 633,028. Patented Sept. 12, 1899.
F. McDONOUGH.
FEED WORKS FOR RESAWING MACHINES.
(Application filed Aug. 23, 1898.)
(No Model.) 8 Sheets—Sheet 5.
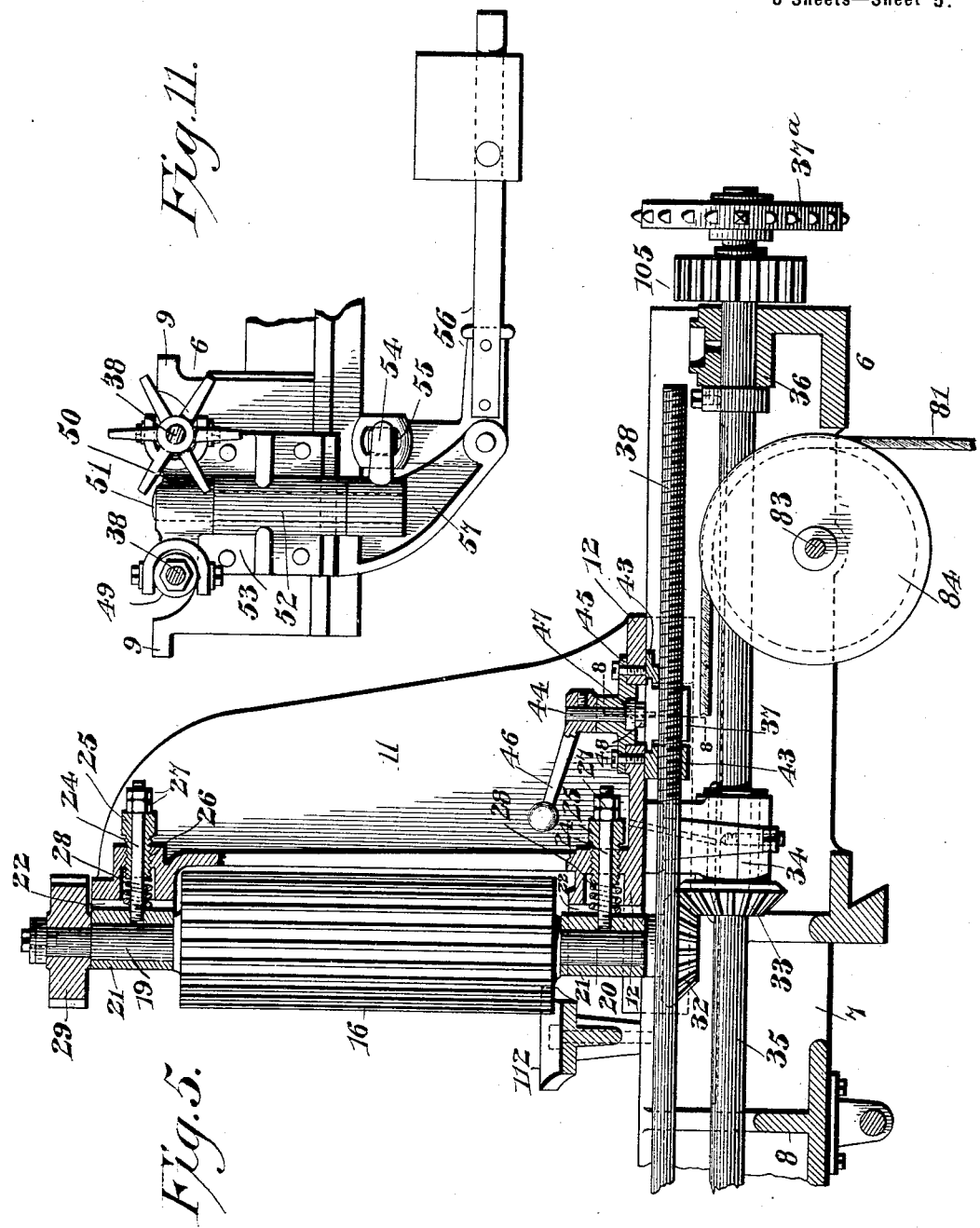

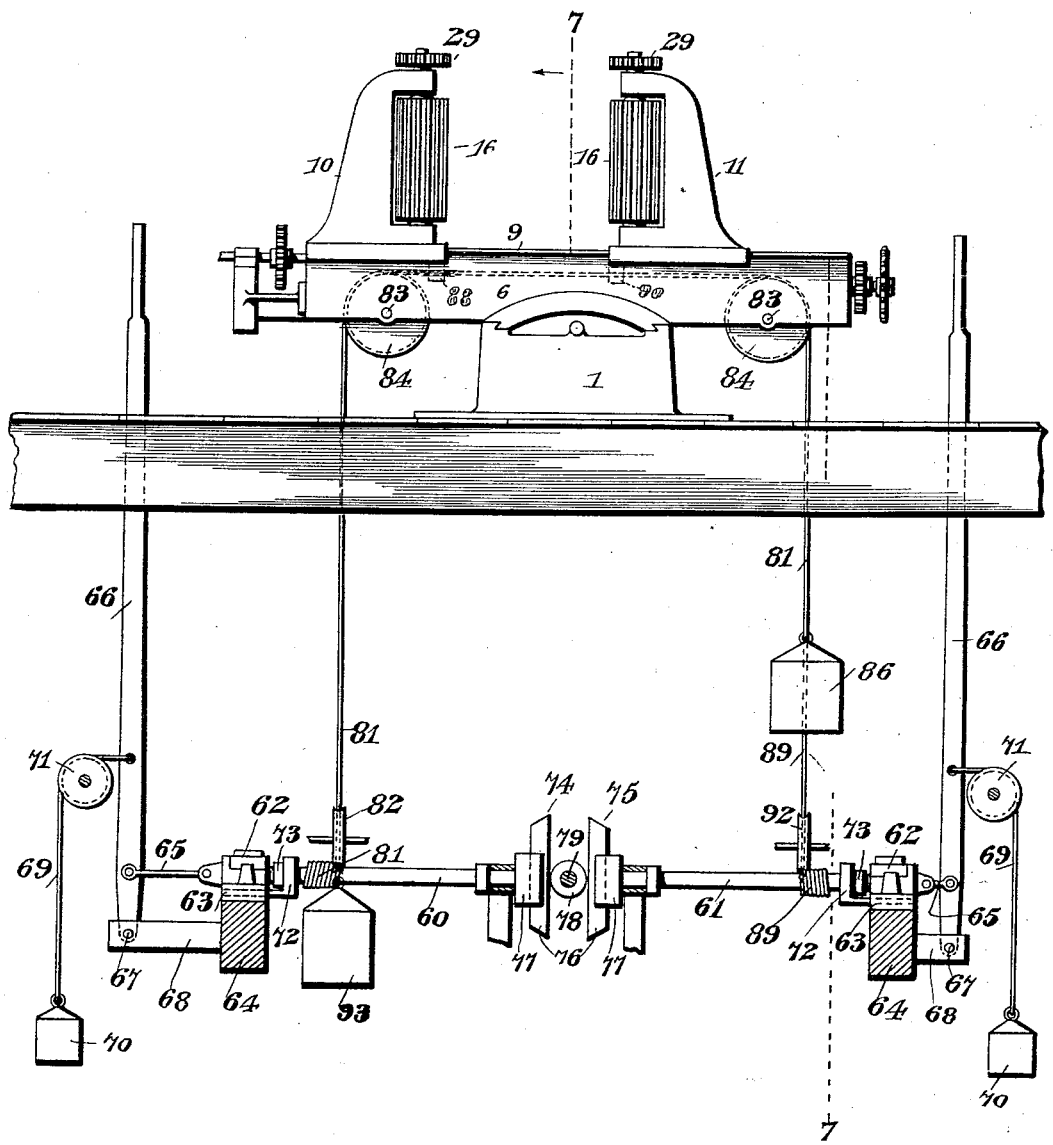

No. 633,028. Patented Sept. 12, 1899.
F. McDONOUGH.
FEED WORKS FOR RESAWING MACHINES.
(Application filed Aug. 23, 1898.)
(No Model.) 8 Sheets—Sheet 7.
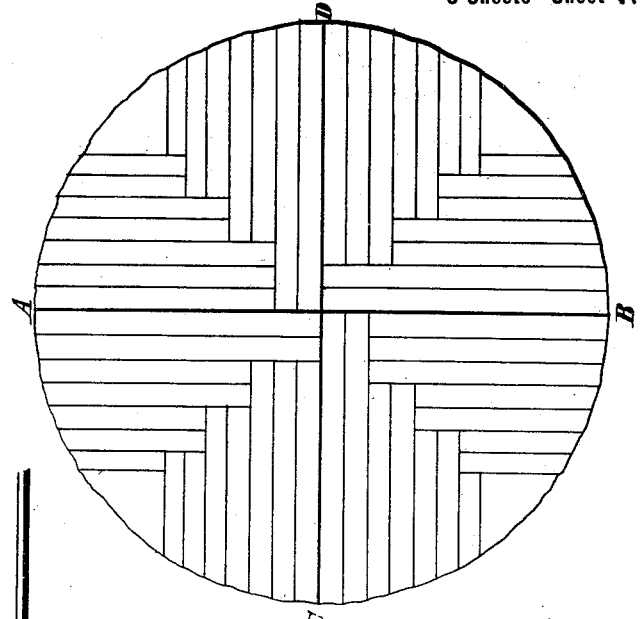
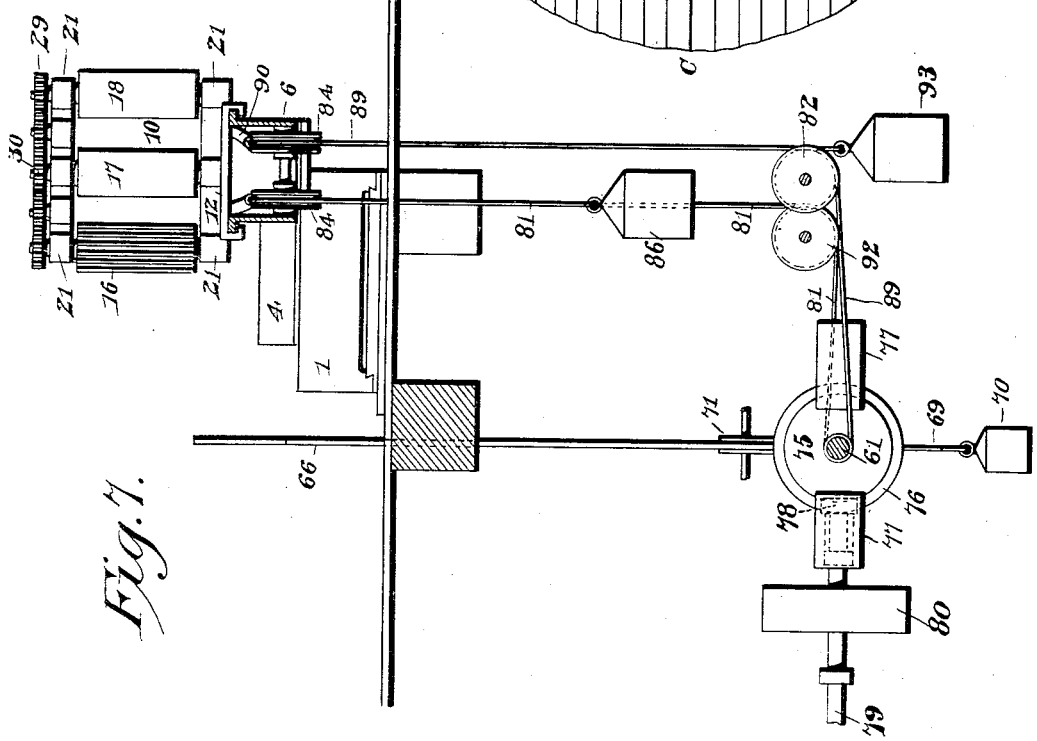
Witnesses
Jas. K. McCathran
D. T. Holhaupter
Frank McDonough Inventor
By his Attorneys,
C. A. Snow & Co.

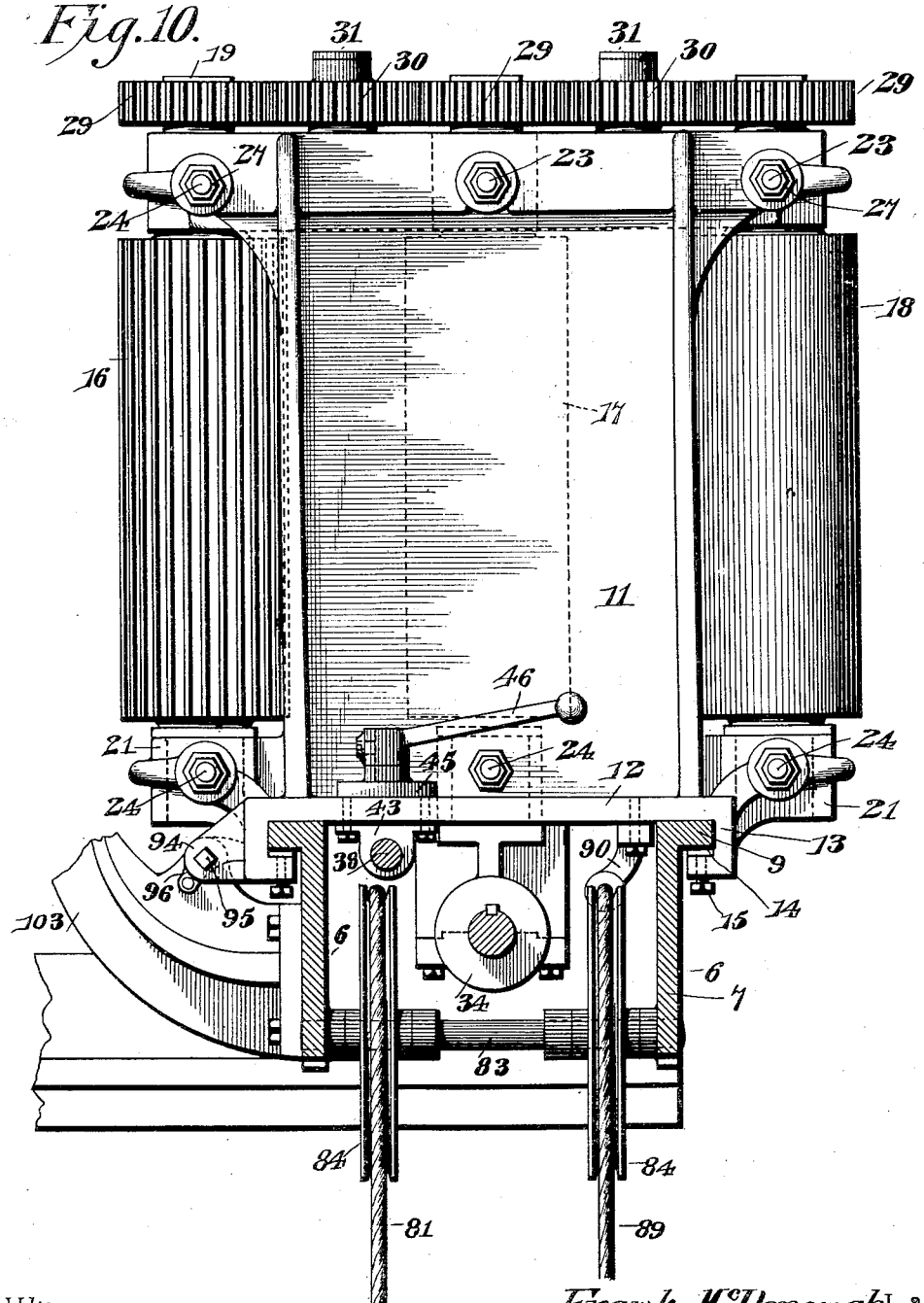

United States Patent Office.

FRANK McDONOUGH, OF EAU CLAIRE, WISCONSIN.

FEED-WORKS FOR RESAWING-MACHINES.

SPECIFICATION forming part of Letters Patent No. 633,028, dated September 12, 1899.

Application filed August 23, 1898. Serial No. 689,332. (No model.)

*To all whom it may concern:*

Be it known that I, FRANK McDONOUGH, a citizen of the United States, residing at Eau Claire, in the county of Eau Claire and State of Wisconsin, have invented new and useful Feed-Works for Resawing-Machines, of which the following is a specification.

This invention relates to feed-works for resawing-machines, especially band resawing-machines, and particularly contemplates a construction of feed-works providing for quarter-sawing of the timber.

To this end the invention primarily contemplates an improved construction of feed-works, rendering it possible to quarter-saw lumber either on a band-resaw or a circular resaw, which operation has not been possible heretofore in connection with the feed-works of ordinary resawing-machines.

While the invention has for a special object provision for feeding quarter-logs to a resaw, and thereby carry out the operation of quarter-sawing, it also contemplates an improved construction which renders the feed-works convertible for different kinds of sawing, such as for sawing flitches, for center or cant sawing, or for sawing cants. In the accomplishment of these several objects the feed-works contemplated by the present invention are capable of a wide range of use, so as to be adapted for practically all kinds of sawing that can be done in connection with a resawing-machine.

With these and other objects in view, which will readily appear as the nature of the invention is better understood, the same consists in the novel construction, combination, and arrangement of parts hereinafter more fully described, illustrated, and claimed, and while the invention is necessarily susceptible to a wide range of modification still the preferred embodiment thereof is illustrated in the accompanying drawings, in which—

Figure 1 is a perspective view of a band-resaw feed-works embodying the improvements contemplated by the present invention and shown in operative relation to a band resawing-machine. Fig. 2 is a top plan view of the complete feed-works. Fig. 3 is a horizontal sectional view in a plane immediately beneath the lower ends of the upright slidable roll-brackets, exposing the working parts arranged and housed within the transverse hollow supporting-bed for such brackets. Fig. 4 is a vertical transverse sectional view on the line 4 4 of Fig. 2. Fig. 5 is a vertical sectional view on the line 5 5 of Fig. 2. Fig. 6 is a front view, partly in diagram, of the complete feed-works, including the pressure mechanism arranged below the floor-line. Fig. 7 is a vertical sectional view on the line 7 7 of Fig. 6. Fig. 8 is an enlarged detail vertical sectional view on the line 8 8 of Fig. 5, showing the construction of the split nut for each adjusting-screw and the adjusting device for operating the nut-sections. Fig. 9 is an enlarged detail view showing more clearly the mounting of the split-nut sections. Fig. 10 is a cross-sectional view of the machine on the line 10 10 of Fig. 2. Fig. 11 is a detail end view showing the tension and equalizing connections with the ends of the screw-adjusting rods. Fig. 12 is a diagram of a log, showing the center and quarter sawing carried out by the improved feed-works.

Referring to the accompanying drawings, the numeral 1 designates the main base-frame of the feed-works, which is slidably supported on a subbase 2 and adjusted relatively thereto through the medium of the set-works or mechanism 3, said set-works or mechanism not being claimed herein, as the same form the subject-matter of my allowed application, Serial No. 668,696, filed January 31, 1898.

The main base-frame 1 slidably supports thereon the work-carriage 4, which is moved on the base-frame in a direction toward and away from the saw through the medium of the carriage-adjusting screw 5, and which screw is arranged and operated in connection with the work-carriage in the manner fully disclosed in my former patent, No. 589,014, issued August 31, 1897.

The work-carriage 4 is provided with a transverse hollow or tubular supporting-bed 6, forming a rigid part of the base portion of the carriage and essentially consisting of the parallel vertically-disposed side plates 7, formed integrally with cross braces or webs 8 and provided at their upper edges with the outturned guide-flanges 9, which form a sliding support for the pair of upright slidable roll-brackets 10 and 11, arranged for adjustment on top of the said supporting-bed 6.

Each of the upright roll-brackets 10 and 11 is formed at its lower end with a slide-plate portion 12, provided at its side edges with the inturned slide-flanges 13, slidably engaging the outturned guide-flanges 9 at the upper side edges of the supporting-bed 6, and interposed in the spaces between the slidably-engaged flanges 9 and 13 are suitable wear-plates 14, adjusted to a working fit by means of the set-screws 15 working in threaded openings formed in the horizontal portions of the flanges 13, such construction being substantially the same as described in my former patent herein referred to. Each of the upright slidable roll-brackets 10 and 11 is slightly arched at its inner side to receive and support therein a group of three upright feed-rolls 16, 17, and 18, all of which rolls are of a uniform size and are transversely alined, so that the inner faces of the rolls, which contact with the timber, will be equidistant from the saw-line. The said rolls are provided with upper and lower shaft extremities 19 and 20, respectively, which are journaled in bearing-boxes 21, slidably fitted in the squared box seats or notches 22, formed at the upper and lower ends of the bracket and at the inner side thereof, it of course being understood that each roll-bracket is provided with a series of the box seats or notches 22, corresponding to the number of upright feed-rolls carried by the bracket. The intermediate and rear upright feed-rolls 17 and 18, carried by each roll-bracket, are of a plain construction, and the bearing-boxes 21 for the upper and lower shaft extremities of these rolls are adjustably secured in place by means of an adjusting-bolt device 23, fitted in the bracket and similar to the corresponding device disclosed in my former patent, the only purpose of the adjusting-bolt device for the upper and lower shaft extremities of the intermediate and rear rolls being to provide for properly centering these rolls and to hold the same perfectly rigid with relation to the saw-line, while the other or front roll 16 of the group or series is permitted to have an independent yielding movement. The said front upright feed-roll 16, carried by each roll-bracket, is preferably provided with a continuous series of longitudinal corrugations, and to provide for the yielding support of this roll in its bearings the upper and lower bearing-boxes 21 therefor have fitted thereto the inner ends of the adjusting-bolts 24, which bolts project through adjusting-sleeves 25, fitted in sleeve-openings 26, formed in the roll-bracket at the upper and lower end portions thereof and opening into the box seats or notches 22 for the bearing-boxes, and nuts 27 are mounted on the exterior-threaded extremities of the bolts 24, so as to work against the outer ends of the sleeves 25 and provide for the adjustment thereof against one end of the cushion-springs 28. These cushion-springs 28 are coiled on the adjusting or tension bolts 24 and are interposed between the inner ends of the sleeves 25 and the movable bearing-boxes 21 for the upper and lower shaft extremities of the roll 16, thereby providing a cushion-back for said roll to permit the same to readily yield and adjust itself to unevennesses of the stock as the same is fed through the works to the saw.

The group of upright feed-rolls 16, 17, and 18, carried by each of the roll-brackets, are positively rotated in a direction for carrying the timber onto the saw, and to provide for this rotation of the rolls the upper shaft extremities of the same are projected above the upper bearing-boxes 21 and have fitted thereon horizontal gear-wheels 29, which mesh with interposed idler-gears 30, journaled on stub-journals 31, fitted in the upper end of the roll-bracket in planes between the feed-rolls, thereby providing for positively gearing together the several rolls, so that the same will rotate in unison. One of the upright feed-rolls of each bracket, preferably the intermediate roll 17, has its lower shaft extremity projected into the hollow supporting-bed 6 and carries a horizontal beveled gear-wheel 32, which meshes with an adjacent vertically-disposed beveled gear wheel or pinion 33, supported for rotation by the bearing-support 34, rigidly attached to the under side of the roll-carrying bracket and splined or feathered on the main drive-shaft 35. The main drive-shaft 35 is arranged within the hollow or tubular supporting-bed 6 and extends from end to end thereof, being journaled at the ends of said support in the bearing-collars 36, formed integrally therewith, and said main drive-shaft 35 has fitted on one of its extremities exterior to the supporting-bed 6 a sprocket drive-wheel 37ª, which receives a suitable drive-chain to provide for imparting motion to the shaft 35. Since each of the roll-carrying brackets 10 and 11 carries the beveled gears 32 and 33, it will be understood that the shaft 35 provides for simultaneously imparting motion to the group of feed-rolls carried by both brackets without interfering with the sliding adjustment of said brackets on the bed-support 6 of the work-carriage 4.

In center or cant sawing the oppositely-located roll-carrying brackets are designed to automatically adjust themselves to unevennesses in the timber and to maintain a corresponding distance from the saw-line, and to provide for this operation and relation of parts it is necessary that the two brackets always move simultaneously and in unison, which result is secured through the medium of the adjusting-nuts 37 and adjusting screw-rods 38, working within the hollow or tubular supporting-bed 6 of the work-carriage. Each of the roll-brackets is equipped with an adjusting screw-rod 38 and an adjusting-nut 37, the adjusting-nut being arranged at the lower end of the bracket and carried therewith, said adjusting-nut being formed in two duplicate sections or halves 39, provided in their opposing faces with registering threaded grooves 40, which when in register form the of gears 105, driven from the main drive-shaft 35, arranged longitudinally within the supporting-bed 6. The front feed-roll 100 is thus given a positive rotation in a direction for feeding the timber between the vertical or upright feed-rolls onto the saw, and beyond the saw is arranged a rear horizontal corrugated feed-roll 106, which receives and carries away the timber as it leaves the saw. The rear horizontal corrugated feed-roll 106 is journaled in suitable bearings on the support 107, carrying the lower guide 108 for the bandsaw 109, and one of the shaft extremities 110 of said rear feed-roll carries a sprocket-wheel 111, which receives a suitable drive-chain for imparting a positive rotation to the rear roll, and said rear roll, as well as the front feed-roll 100, are arranged with their top surfaces flush or even with the central timber-rest or bearing-bar 112, fastened on top of the supporting-bed 6 centrally between its ends and transversely thereof in direct alinement with the band-saw. The band-saw 109 is carried by the upper and lower band-wheels 113 and 114 of an ordinary band resaw-mill 115; but it will of course be understood that the feed-works herein described could be adapted for use in connection with a circular resaw as well as with a band-resaw.

The feed-works herein described are designed for completely resawing a log, and especially for carrying out the operation of quarter-sawing in connection with a band or circular resaw, which has heretofore not been possible with feed-works of band resawing-machines, and in order to understand the different operations of the machine reference is first made to the diagram shown in Fig. 12 of the drawings, which diagram illustrates a log as it would appear assembled after being completely quarter-sawed. It will be understood that the log is first received split or sawed longitudinally in the center on the line A B and is then in halves, and to provide for resawing the half-logs on the line C D, so as to split up the log in four quarters, the half-logs are passed through the works simply on the front and rear horizontal rolls 100 and 106, during which operation the roll-carrying brackets are opened up away from the timber-rest and held in such open position.

To provide for opening up the roll-carrying brackets away from the timber-rest to carry out the operation of sawing half-logs into quarter-logs, both of the levers 66 are moved simultaneously in an inward direction toward each other, which movement causes both of the friction disks or wheels 74 and 75 to be carried into frictional contact with the friction drive-pulley 78, thereby imparting rotation to the shafts 60 and 61 and winding up both of the cables 81 and 89. The winding up of both cables causes both of the roll-carrying brackets 10 and 11 to be simultaneously drawn in a direction toward the ends of the supporting-bed 6 and away from the central timber-rest 112. When the roll-carrying brackets are opened up far enough away from the timber-rest to permit the half-log to be cut through its center, the levers 66 are released, so as to permit the weights 70, connected therewith, to carry the same in an outward direction. This movement of the levers 66 for both of the shafts 60 and 61 causes the friction disks or wheels 74 and 75 to be drawn in frictional contact with their respective brake shoes or blocks 77, which locks the said disks or wheels 74 and 75 against rotation and prevents the pressure-weights 86 and 93 from drawing the roll-carrying brackets back toward the timber-rest. When the half-logs have been quartered, the operation of quarter-sawing them takes place, and during such operation it will of course be understood that the nuts 37 and screw-rods 38 are not in use, so as to throw out of connection the equalizing or tension devices connected with said screw-rods, so as not to interfere with the roll-carrying brackets being freely adjusted in connection with the pressure mechanism below the floor. In quarter-sawing one of the roll-carrying brackets and rolls therein must be held perfectly stationary or rigid in its adjusted position, while the opposite bracket and the rolls carried thereby will be free to yield, so as to adjust themselves to unevennesses of the quarter-log, and in making the first cuts on a quarter-log, assuming that the right bracket 11 is to be the stationary or fixed bracket, it will be understood that the weight 93, attached to one end of the pressure-cable 89 for such bracket, will be permitted to bring the bracket to a position disposing the surfaces of the rolls carried thereby about one inch from the saw-line, which position is indicated in Fig. 6 of the drawings; but it will of course be understood that the regulation of the thickness of the cut is accomplished by means of the stop-screw 95 of the bracket 11 coming in contact with the stop projection 97. When adjusted to this position, the right-hand bracket 11 is secured fast by means of the set-screw fastening 98. With the bracket 11 adjusted to a fixed position in the manner described the opposite roll-carrying bracket 10 is carried back away from the saw-line by moving the lever 66 for the shaft 60 inward, so as to carry the friction disk or wheel 74 of such shaft against the friction-pulley 78, thereby rotating the shaft 60 and winding up the cable 81 thereon in a direction which will provide for moving the bracket 10 outward, at the same time also raising the pressure or tension weight 86, attached to one end of said cable 81. With the parts thus positioned the quarter-log can be entered with one flat face riding on top of the horizontal feed-rolls and the other flat face bearing against the group of rolls carried by the fixed or stationary bracket 11. By now releasing the lever 66 for the shaft 60 and permitting the weight 86 to come into play such weight will slide the bracket 10 forward toward the saw-line until the rolls thereof are held firmly against the uneven edge of the log, as plainly shown in Fig. 1 of the drawings, and by reason of the employment of the weight 86 the rolls carried by the bracket 10 will readily yield to or follow up any unevennesses in the log, and thereby keep the flat vertical face of the log firmly against the fixedly-positioned rolls of the stationary bracket 10, which rolls therefore practically act in the capacity of guiding-rolls. At this point it may be explained that when it is desired to allow either of the roll-carrying brackets to be drawn inward by the weighted cable the lever 66 for controlling such bracket is moved to a central or intermediate position, so as to carry the friction disk or wheel away from the brake shoes or blocks 77. After two or more boards have been taken off from the face of the quarter-log next to the rolls carried by the bracket 11 the log is turned one-quarter, so that the other flat face thereof will lie in a vertical plane, thereby rendering it necessary to reverse the fixed and movable relation of the two roll-carrying brackets. To do this it is simply necessary to adjust the bracket 10 to the proper position with respect to the saw-line and secure the same fast in such position, while through the medium of the shaft 61 and the cable 89 and the weight 93 the other bracket 11 is adjusted to allow the quarter-log to be positioned and is yieldingly held against the uneven edge thereof until the requisite number of boards have been sawed off.

In adjusting the machine for center or cant sawing the weights attached to the cables 81 and 89 are disconnected, so as to throw the pressure mechanism out of use, and the split nuts 37 are thrown into engagement with the threads of the screw-adjusting rod 38 after both roll-brackets have been brought to a position so that their stop-screws will engage the plates 96 of the stop-projections 97. The said stop-plates 96 are then thrown out of the way, and the equalizing and tension devices connected with one end of the rods 38 are permitted to operate in the manner fully described in my former patent herein referred to.

An important adaptation of the herein-described machine is for sawing up "cants," and it may be explained at this point that in cant-sawing the boards are all taken from one face, as distinguished from quarter-sawing, in which two or more boards are taken from one face and then the same number from the other face. Therefore in cant-sawing no particular attention is given to the direction in which the grain of the stock runs, and as all boards are taken from one face it is unnecessary to turn the cant or readjust the rolls in their fixed and movable relations, as required in quarter-sawing. It will therefore be understood that in sawing up cants the operation is substantially the same as for quarter-sawing with the exception that after the roll-carrying brackets have been once set the same are not disturbed until the sawing of the cant is completed. To further explain the operation of cant-sawing within the herein-described machine it may be stated that the cant referred to is simply a log with a slab taken off of opposite sides, leaving the other two sides of the log in their natural shape. This cant is placed on the horizontal feed-rolls after one set of vertical rolls have been opened up far enough on one side to admit the cant and lying on one of its flat sides on said horizontal feed-rolls, is allowed to pass the saw, so that a slab is taken from one of its natural or bark sides. In this operation the opposite set of vertical rolls are carried back only far enough to allow the sawed slab to pass. After this operation is completed the cant is provided with three flat faces, two being disposed in a horizontal plane and the remaining or third flat face in a vertical plane. Then the rolls on the vertical flat face or side of the cant are brought up to within about one inch from the saw to form fixedly-positioned guide-rolls in the same manner as in quarter-sawing, after which the cant is passed and repassed, taking off a board at a time until the cant is entirely worked up, leaving only a single slab at the final operation.

Another way in which the cant could be handled in the machine would be instead of taking off the first slab, as above described, to receive the cant at the resawing-machine in the condition described above and then opening up the vertical rolls on both sides far enough to permit of the cant being sawed through the center. This would form two cants with three flat faces, when the operation to follow would be the same as already set forth.

From the foregoing it will be seen that the feed-works herein described have a wide range of application for different kinds of sawing, especially quarter-sawing, and while the preferred construction of the different parts has been specifically pointed out it will be understood that various changes in the form, proportion, and the minor details of construction may be resorted to without departing from the principle or sacrificing any of the advantages of this invention.

Reference has already been made to the fact that the construction and arrangement of parts at the outer ends of the screw-adjusting rods 38 is similar in all respects to what is disclosed in my former patent, No. 589,014; but an additional feature is contemplated by the present invention—namely, the provision of a suitable connection with one or both of the screw-adjusting rods, whereby the roll-carrying brackets may be adjusted with the screw-rods 38 by means of power. A convenient way of accomplishing this result is to mount on the outer extremity of one of said screw-adjusting rods 38 a sprocket-wheel 120, receiving a chain 121, driven from a suitable drive connection, and providing means when in motion for simultaneously rotating both adjusting-screws through their respective nuts. In this way the oppositely-located sets of rolls may be opened and closed by means of power; but in some cases, especially in center-sawing, a crank 122 may be applied to the outer end of one of the screw-adjusting rods in the usual manner and the sprocket-chain 121 disconnected, so that the adjustment can be accomplished manually.

Having thus described the invention, what is claimed as new, and desired to be secured by Letters Patent, is—

1. In a resawing-machine feed-works, the supporting-bed, a pair of roll-brackets supported on the bed, a group of feed-rolls supported by each bracket, means for yieldingly supporting the front roll of each group to permit an independent self-adjustment thereof, and means for adjustably and rigidly holding the remaining rolls of each group to their bracket, substantially as set forth.

2. In a resawing-machine feed-works, the supporting-bed, a pair of upright roll-brackets supported on the bed, a group of transversely-alined upright feed-rolls supported by each bracket at the inner side thereof, means for rigidly holding the intermediate and rear rolls to the brackets, and separate means for yieldingly supporting the front rolls of the brackets to permit an independent self-adjustment thereof, substantially as set forth.

3. In a resawing-machine feed-works, the supporting-bed, a pair of opposing upright roll-brackets supported on the bed, a group of transversely-alined upright feed-rolls arranged at the inner side of each bracket, adjustable bearing-boxes fitted to each bracket and receiving the upper and lower shaft extremities of the rolls carried thereby, means for rigidly holding the bearing-boxes for the intermediate and rear rolls in their adjusted positions, and separate means for yieldingly supporting the bearing-boxes for the front rolls, substantially as set forth.

4. In a resawing-machine feed-works, the supporting-bed, a pair of opposing upright roll-brackets supported on the bed and provided at their upper and lower ends with an alined series of box seats or notches, a group of transversely-alined upright feed-rolls arranged at the inner side of each bracket, bearing-boxes fitted in said box seats or notches and receiving the upper and lower extremities of the feed-rolls, adjusting devices for the bearing-boxes for the intermediate and rear rolls, yielding cushions supported in rear of the bearing-boxes for the shaft extremities of the front feed-rolls, and adjusting-bolt devices connected with the latter bearing-boxes and carrying adjusting-sleeves bearing against said cushions to regulate the tension thereof, substantially as set forth.

5. In a resawing-machine feed-works, the work-carriage having a supporting-bed, a pair of upright brackets supported on the bed and carrying at their inner sides a plurality of upright feed-rolls, the front feed-rolls being corrugated, a horizontal corrugated front feed-roll supported at the front side of the bed contiguous to the plane of the upright corrugated front feed-rolls, a horizontal corrugated feed-roll arranged beyond the saw and the rear side of the bed, and means for positively rotating all of the feed-rolls, substantially as set forth.

6. In a resawing-machine feed-works, the work-carriage having a supporting-bed, a pair of upright brackets slidably supported on the bed and carrying at their inner sides a plurality of upright feed-rolls, a pair of screw-adjusting rods having tension and equalizing connections therewith, an independent pressure mechanism having separate connections with the separate roll-brackets, an adjusting-nut fitted to each roll-bracket, and means for throwing said nuts in and out of operative relation to said adjusting-rods to provide for bringing into action either the said rods and their attachments or the independent pressure mechanism, substantially as set forth.

7. In a resawing-machine feed-works, the work-carriage having a supporting-bed, a pair of upright brackets slidably supported on the bed and carrying at their inner sides a plurality of upright feed-rolls, tension and equalizing mechanism having separate adjusting connections with the two brackets to provide for their adjustment and movement in unison, an independent pressure mechanism also having separate connections with the two brackets, and means for releasing the roll-brackets from the influence of the tension and equalizing mechanism, substantially as set forth.

8. In a resawing-machine feed-works, the supporting-bed, a pair of upright brackets slidably supported on the bed and carrying a plurality of upright feed-rolls, tension and equalizing mechanism having separate adjusting connections with the brackets to provide for their adjustment and movement in unison, an independent pressure mechanism also having separate connections with the two brackets, and a device carried by each roll-bracket for disengaging the adjusting connection of the tension and equalizing mechanism, substantially as set forth.

9. In a resawing-machine feed-works, the supporting-bed, a pair of upright brackets slidably supported on the bed and carrying upright feed-rolls, a pair of screw-adjusting rods having tension and equalizing connections therewith, a split adjusting-nut supported at the lower end of each bracket, and an adjusting device for moving the nut-sections in and out of engagement with the screw-adjusting rod therefor, substantially as set forth.

10. In a resawing-machine feed-works, the supporting-bed, a pair of upright brackets slidably supported on the bed and carrying upright feed-rolls, a pair of screw-adjusting rods having tension and equalizing connections therewith, a pair of rabbeted parallel guide plates or strips rigidly fastened to the lower end of each bracket, a split nut for each bracket having flanged sections or halves slidably supported by the guide plates or strips, a short vertical rock-shaft mounted in a bearing at the lower end of each bracket and carrying a crank-handle at its upper end and a cross-head at its lower end, and adjusting-links pivoted to the opposite portion of the cross-head and respectively to the separate nut sections or halves, substantially as set forth.

11. In a resawing-machine feed-works, the supporting-bed, a pair of brackets slidably supported on the bed and carrying upright feed-rolls, means for yieldingly pressing the brackets toward the saw-line, a stop for limiting the inward movement of each bracket in a direction toward the saw-line, and separate fastening means for holding one of the brackets rigid at the point where arrested by the stop while the other bracket is free to slide, substantially as set forth.

12. In a resawing-machine for feed-rolls, the supporting-bed, a pair of brackets slidably supported on the bed and carrying upright feed-rolls, pressure mechanism for yieldingly pressing the brackets toward the saw-line, a variable stop for limiting the inward movement of each bracket in a direction toward the saw-line, and separate means for rigidly holding either of the brackets at its inward limit of movement, while the other bracket is free to slide, substantially as set forth.

13. In a resawing-machine feed-works, the supporting-bed having offset stop projections at one side, the upright brackets slidably supported on the bed and carrying upright feed-rolls, said brackets also having screw-lugs, set-screws mounted in said screw-lugs and adapted to engage the stop projections and limit the inward movement of the bracket-adjusting devices for yieldingly pressing the brackets in a direction toward the stop projections, and separate fastening means for holding either of the brackets rigid at its inward limit of movement while the other bracket is free to slide, substantially as set forth.

14. In a resawing-machine feed-works, the supporting-bed having offset stop projections, facing-plates pivotally supported on said stop projections, upright brackets slidably supported on the bed and carrying upright feed-rolls and adjustable stop-screws adapted to engage the facing-plates of the stop projections and limit the inward movement of the brackets, means for yieldingly moving the brackets in a direction toward the stop projections, and separate fastening means for holding either of the brackets rigid at its inward limit of movement while the other bracket is free to slide, substantially as set forth.

15. In a resawing-machine feed-works, the supporting-bed, a pair of upright roll-carrying brackets slidably supported on the bed, a separate pressure or tension cable for each bracket having a connection therewith, means for placing stress upon the cable in both directions, and a fastening device for each bracket to hold one bracket in a fixed or rigid position, while the other bracket is permitted to yield or move, substantially as set forth.

16. In a resawing-machine feed-works, the supporting-bed, a pair of upright brackets supported on the bed and carrying upright feed-rolls, a pressure or tension cable for each bracket having a weight or equivalent connection at one end and also connected with the bracket, and a winding device connected with the other end of the cable, substantially as set forth.

17. In a resawing-machine feed-works, the supporting-bed, a pair of upright roll-carrying brackets slidably supported on the bed, a separate pressure or tension cable for each bracket having a connection therewith and carrying at one end a weight for drawing the bracket in one direction, a winding device connected with the other end of the cable, and a fastening device for each bracket to hold one bracket in a fixed position while the other is permitted to yield or move, substantially as set forth.

18. In a resawing-machine feed-works, the supporting-bed carrying at each end thereof a pair of guide pulleys or sheaves, a separate pressure or tension cable for each bracket having a connection therewith and running through the supporting-bed over the guide pulleys or sheaves at the ends thereof, each cable carrying at one end a weight for drawing the bracket to which it is attached in one direction, and a winding device connected with the other end of each cable, substantially as set forth.

19. In a resawing-machine feed-works, the supporting-bed, a pair of upright roll-carrying brackets slidably supported on the bed, a pair of alined longitudinally-movable winding-shafts carrying at their contiguous ends friction disks or wheels, a common friction-pulley arranged between said friction disks or wheels and adapted to be engaged by either of the same, means for moving said shafts longitudinally in both directions, a separate pressure or tension cable for each bracket having a connection therewith and carrying at one end a weight for drawing the bracket in one direction, the other end of each cable being connected to one of the winding-shafts, substantially as set forth.

20. In a resawing-machine feed-works, the supporting-bed, a pair of upright roll-carrying brackets slidably supported on the bed, a pair of alined longitudinally-movable winding-shafts carrying at their contiguous ends friction disks or wheels, a common friction-pulley arranged between said disks or wheels and adapted to be engaged by either of the same, sliding bearing-boxes receiving one end of the winding-shafts and movable therewith, an adjusting-lever for each sliding bearing-box and having a weight or equivalent connection therewith, brake-shoes arranged in a fixed position at the sides of the friction disks or wheels opposite the friction-pulley, and a separate pressure or tension cable for each bracket, having a connection therewith and carrying at one end a weight for drawing the bracket in one direction, the other end of each cable being connected to one of the winding-shafts, substantially as set forth.

In testimony that I claim the foregoing as my own I have hereto affixed my signature in the presence of two witnesses.

FRANK McDONOUGH.

Witnesses:
FRANK H. BROWN,
GEO. T. THOMPSON.